United States Patent
Yoshikoshi

(10) Patent No.: US 6,819,880 B2
(45) Date of Patent: Nov. 16, 2004

(54) LOSS OF SIGNAL DETECTION CIRCUIT FOR LIGHT RECEIVER

(75) Inventor: Rentaro Yoshikoshi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 575 days.

(21) Appl. No.: 09/901,118

(22) Filed: Jul. 10, 2001

(65) Prior Publication Data

US 2002/0051271 A1 May 2, 2002

(30) Foreign Application Priority Data

Oct. 26, 2000 (JP) ........................................ 2000-326880

(51) Int. Cl.[7] .............................................. H04B 10/06
(52) U.S. Cl. ....................... 398/202; 398/213; 398/214; 398/25; 398/26; 398/27; 398/155; 375/222; 375/226; 375/326; 375/327; 375/317; 714/704; 714/708; 714/709; 714/712
(58) Field of Search ................................. 398/202, 213, 398/214, 25, 26, 27, 155; 375/222, 226, 326, 327, 317; 714/704, 708, 709, 712

(56) References Cited

U.S. PATENT DOCUMENTS 4,475,210 A * 10/1984 Couch ........................ 375/224
6,430,715 B1 * 8/2002 Myers et al. ................ 714/704
6,538,779 B1 * 3/2003 Takeshita et al. ............. 398/27

FOREIGN PATENT DOCUMENTS

JP          3-019454          1/1991

* cited by examiner

Primary Examiner—Hanh Phan
(74) Attorney, Agent, or Firm—Burns, Doane, Swecker & Mathis, L.L.P.

(57) ABSTRACT

An increase in the code error rate in a received signal is detected in a light receiver. An loss of signal detector circuit for a light receiver 20 comprises a main discrimination circuit 8a for comparing the intensity of an electric signal obtained by converting a light signal by photoelectric conversion using a photoelectric conversion element 1 with a predetermined discrimination threshold; a reference discrimination circuit (8b, 8c, ... ) for comparing the intensity of the electric signal with regard to a reference threshold which differs from the discrimination threshold; and an operation circuit 9 for detecting loss of the signal based on the results of the comparisons performed by the main discrimination circuit 8a and the reference discrimination circuit (8b, 8c, ... ).

8 Claims, 9 Drawing Sheets

LOSS OF SIGNAL DETECTION CIRCUIT FOR LIGHT RECEIVER

BACKGROUND OF THE INVENTION

1. Field of the Invention

The present invention relates to an loss of signal detection circuit for a light receiver, which is used in optical communication or the like for detecting loss of signal in a light receiver comprising a photoelectric conversion element which performs photoelectric conversion from a light signal to an electric signal. More specifically, the present invention relates to loss of signal detection in accordance with a code error rate.

2. Description of Related Art

FIG. 9 is a block diagram of an loss of signal detector circuit for a related art light receiver 21. Referring to FIG. 9, the loss of signal detector circuit 21 comprises a photoelectric conversion element 1 for converting a light signal, which is an input, into a current signal; a transimpedance pre-amplifier 2 for converting a current signal into a voltage signal having an appropriate amplitude; a feedback resistor 3 for setting a gain of the transimpedance pre-amplifier 2; a post-amplifier 4 for amplifying an output signal of the transimpedance pre-amplifier 2; and a peak detector circuit 17 for outputting a signal having an amplification proportional to that of the output signal from the post-amplifier 4. The detector circuit 21 further comprises a threshold generating circuit 18 for generating a threshold signal for issuing an alarm signal; and a comparator 19 which outputs an alarm signal from an alarm signal output terminal 10 when the level of the output signal from the peak detector circuit 17 is higher (or lower) than that of the output signal from the threshold generating circuit 18.

The operation of the loss of signal detector circuit for light receiver 21 will be described. In the loss of signal detector circuit 21, a digital light signal, which is discriminated as a light signal "H" with high intensity (amplification) or as a light signal "L" with low intensity, is input to the photoelectric conversion element 1, which converts the input light signal into a current signal. The current signal is then input to the transimpedance preamplifier 2, which converts the current signal into a voltage signal having an appropriate amplification in accordance with the amplification of the input current signal. The voltage signal is supplied to the post-amplifier 4 where the voltage signal is amplified such that the amplification detection function can be normally operated in the peak detector circuit 17. The peak detector circuit 17 outputs a signal having an amplification proportional to the amplification of the output signal from the post-amplifier 4. The threshold generating circuit 18 generates a threshold signal at a level suitable for a particular use. The comparator 19 then compares the output signal from the peak detector circuit 17 and the threshold signal from the threshold generating circuit 18, and, when the level of the output signal of the peak detector circuit 17 is lower than that of the threshold signal from the threshold generating circuit 18, for example, outputs an alarm signal through the alarm signal output terminal 10 as an alarm output signal of the loss of signal detector circuit for a light receiver 21. In the loss of signal detector thus configured, an alarm signal can be output from the alarm signal output terminal 10 when the level of light input to the photoelectric conversion element 1 is below the predetermined level.

In recent years, there has developed a demand for light receivers capable of issuing and alarm when the code error rate of a light signal exceeds the predetermined level. However, because the code error rate largely depends on noise components of a signal, it has been impossible to use the conventional loss of signal detector circuit for a light receiver of the type described above, which relies on the intensity of light input and does not take consideration of noise components, as a circuit for detecting loss of signal in accordance with an increase in the code error rate.

The present invention was made in view of the foregoing problems of the related art, and aims to enable detection, in a light receiver, of an increase in the code error rate due to an increase in noise components of a signal caused by variations of components such as a photoelectric conversion element, a temperature change, a voltage change, or the like in such a component.

SUMMARY OF THE INVENTION

In view of the foregoing problems, in accordance with a first aspect of the present invention, there is provided a loss of signal detector circuit for a light receiver comprising a main discrimination circuit for comparing the intensity of an electric signal, obtained by photoelectrically converting a light signal using a photoelectric conversion element, with a predetermined discrimination threshold; a reference discrimination circuit for comparing the intensity of the electric signal with a reference threshold which differs from said discrimination threshold; and an operation circuit for detecting loss of the signal based on the results of the comparisons performed by said main discrimination circuit and said reference discrimination circuit.

In the above loss of signal detector circuit, said operation circuit counts, for a predetermined time period, the number of instances wherein the comparison result indicating that the intensity of an electrical signal is higher or lower than said discrimination threshold differs from the comparison result indicating that the intensity of an electrical signal is higher or lower than said reference threshold, and determines a loss of signal when the counted number exceeds a predetermined value.

Said discrimination threshold is determined such that the probability of a low level signal being judged as a high level signal equals the probability of a high level signal being judged as a low level signal when said discrimination threshold is set in said main discrimination circuit.

A light receiver comprising a photoelectric conversion element for photoelectrically converting a light signal into an electrical signal and a loss of signal detector circuit having the foregoing structure is also provided.

While normally the accuracy of discrimination and the probability of error can not be reliably determined only from the discrimination results of the main discrimination circuit, according to the structure as described above, it is possible to estimate the code error rate based on the incidence of signal misjudgment in the main discrimination circuit from the discrimination results with regard to both the discrimination threshold and the reference threshold which differs from the discrimination threshold.

In accordance with a second aspect of the present invention, there is provided a loss of signal detector circuit for a light receiver comprising a main discrimination circuit for comparing the intensity of an electric signal, obtained by photoelectrically converting a light signal using a photoelectric conversion element, with a predetermined discrimination threshold at a predetermined discrimination timing; a reference discrimination circuit for comparing the intensity of the electric signal with said discrimination threshold at a reference timing other than said discrimination timing; and an operation circuit for detecting loss of the signal based on the results of the comparisons performed by said main discrimination circuit and said reference discrimination circuit.

Said operation circuit counts, for a predetermined period of time, the number of instances wherein the comparison result indicating that the intensity of an electrical signal is higher or lower said discrimination threshold at said discrimination timing differs from the comparison result indicating that the intensity of an electrical signal is higher or lower than said discrimination threshold at said reference timing, and determines a loss of signal when the counted number exceeds a predetermined value.

Said discrimination timing is determined such that the probability that an electrical signal which should reach the discrimination threshold at an earlier signal change timing in an eye pattern actually reaches the discrimination threshold at a timing later than said earlier signal change timing equals the probability that an electrical signal which should reach the discrimination threshold at a later signal change timing in the eye pattern actually reaches the discrimination threshold at a timing earlier than said later signal change timing, when said discrimination timing is set in said main discrimination circuit.

A light receiver comprising a photoelectric conversion element for photoelectrically converting a light signal into an electric signal and a loss of signal detector circuit having the foregoing structure is also provided.

With the above structure, it is possible to detect the code error rate in the main discrimination circuit from the discrimination results at the discrimination timing and the discrimination results at the reference timing, which differs from the discrimination timing.

Further, in accordance with a third aspect of the present invention, there is provided a loss of signal detector circuit for a light receiver comprising a main discrimination circuit for comparing the intensity of an electric signal, obtained by photoelectrically converting a light signal using a photoelectric conversion element, with a predetermined main discrimination threshold at a predetermined main discrimination timing; a first reference discrimination circuit for comparing, at said main discrimination timing, the intensity of the electric signal with a reference threshold other than said main discrimination threshold; a second reference discrimination circuit for comparing the intensity of the electric signal with said main discrimination threshold at a reference timing other than said main discrimination timing; and an operation circuit for detecting loss of the signal based on the results of the comparisons performed by said main discrimination circuit, said first reference discrimination circuit, and said second reference discrimination circuit.

A light receiver comprising a photoelectric conversion element for photoelectrically converting a light signal into an electric signal, and a loss of signal detector circuit having the foregoing structure is also provided.

With the above structure, it is possible to detect the code error rate in the main discrimination circuit based on the comparison results with regard to the discrimination threshold at the discrimination timing, the comparison results with reference to the reference threshold which differs from the discrimination threshold, and the comparison results at the reference timing which differs from the discrimination timing.

BRIEF DESCRIPTION OF THE DRAWINGS

These and other objects of the invention will be explained in the description below, in connection with the accompanying drawings, in which.

DETAILED DESCRIPTION OF THE PREFERRED EMBODIMENT

A preferred embodiment of the present invention will be described in further detail with reference to the accompanying drawings.

Figure 1:
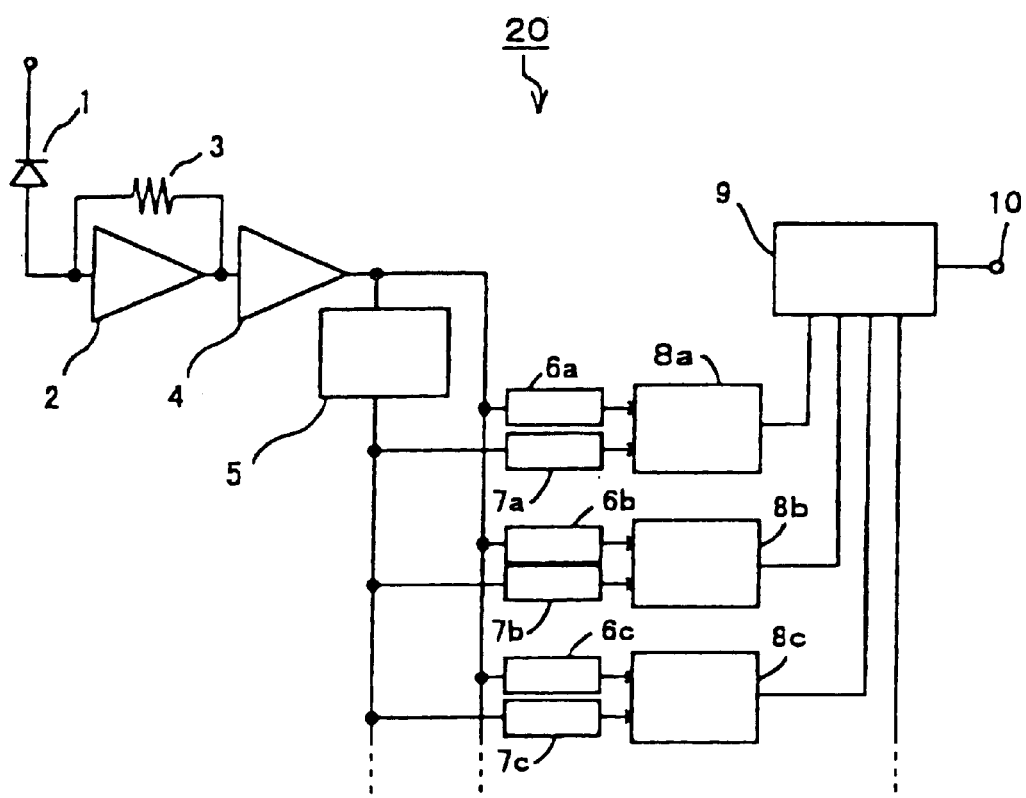
FIG. 1 is a block diagram of a loss of signal detector circuit for a light receiver according to a preferred embodiment of the invention.

FIG. 1 is a block diagram of an loss of signal detector circuit for a light receiver 20 according to an embodiment of the present invention. Referring to FIG. 1, the loss of signal detector circuit 20 comprises a photoelectric conversion element 1 (a photodiode, for example) for converting a light signal, which is an input, into a current signal; a transimpedance preamplifier 2 for converting a current signal into a voltage signal having an appropriate amplitude; a feedback resistor 3 for setting an amplification factor (namely, a gain) of the transimpedance preamplifier 2; a post-amplifier 4 for amplifying an output signal of the transimpedance preamplifier 2; a clock extraction circuit 5 for extracting a clock signal from an output signal of the post amplifier 4; level shift circuits 6 (6a, 6b, 6c, . . . ) for respectively shifting the level (amplification) of an output signal of the post amplifier 4 in an appropriate manner; clock delay circuits 7 (7a, 7b, 7c, . . . ) provided corresponding to respective level shift circuits 6 for respectively delaying the output clock signal from the clock extraction circuit 5 in an appropriate manner; discrimination circuits 8 (8a, 8b, 8c) provided corresponding to the respective level shift circuits 6 and the respective clock delay circuits 7 for respectively discriminating between the signal levels "H" and "L" based on the output signals from the corresponding level shift circuits 6 and the clock delay circuits 7; an operation circuit 9 for executing counting and operation for the discrimination results based on the outputs from the respective discrimination circuits 8 to issue an alarm signal; and an alarm output terminal 10 for outputting the alarm signal issued from the operation circuit 9.

Operation of the loss of signal detector circuit 20 will next be described. For example, a digital light pulse signal whose intensity is randomly modulated at fixed pulse intervals is input to the photoelectric conversion element 1, where it is converted into a current pulse signal which is an electrical signal. The current pulse signal is amplified by the transimpedance preamplifier 2 and the post amplifier 4, so that the signal has an appropriate amplification.

Figure 2:
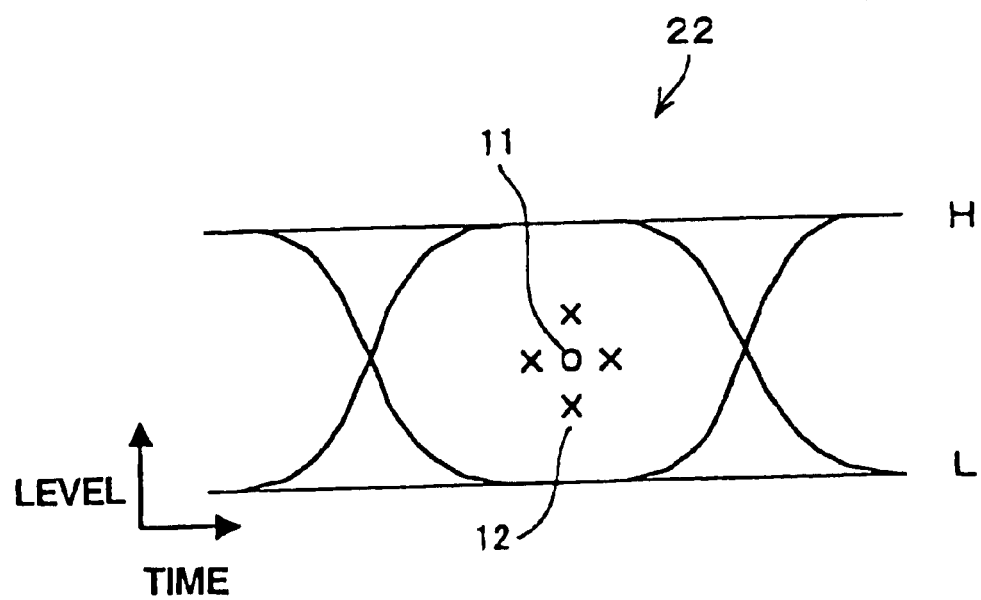
FIG. 2 is a diagram showing an eye pattern and discrimination points of a signal in a loss of signal detector circuit for a light receiver according to the preferred embodiment of the present invention.

FIG. 2 shows an eye pattern of a current pulse signal after amplification. In FIG. 2, the horizontal axis denotes time and the vertical axis denotes the amplification (level). In the eye pattern, a true discrimination point 11 is set at the center part (shown in a circle) of an eye 22 for discriminating between the levels (i.e., the amplification), "H" (high) and "L" (low), of a code in a signal. Namely, for each code, the level of the signal is compared with the true discrimination point 11. When the signal level is greater than or equal to the discrimination threshold of the true discrimination point 11, the code is judged as "H" (high). When the signal level is smaller than the discrimination threshold of the true discrimination point 11, on the other hand, the code is judged as "L" (low).

The above discrimination between "H" and "L" with regard to the true discrimination point 11 is performed in the main discrimination circuit 8a. In order to ensure accuracy of discrimination, the amplification and time of a signal is offset before it is input to the main discrimination circuit 8a. The amplification offset is performed in the first level shift circuit 6a and the time offset is performed in the first clock delay circuit 7a. Specifically, the true discrimination point 11 is adjusted by the first level shift circuit 6a such that it is located in substantially the middle of the vertical direction (the amplification direction) of a predetermined eye pattern, and is also adjusted by the first clock delay circuit 7a such that it is located in substantially the middle of the horizontal direction (the time axis direction) of the eye pattern. By these offsets, the discrimination threshold and the discrimination timing is set or adjusted in the main discrimination circuit 8a. In this embodiment, the first level shift circuit 6a is connected to an output of the post amplifier 4 and to an input of the main discrimination circuit 8a, and the first clock delay circuit 7a is connected to an output of the clock extraction circuit 5 and an input of the main discrimination circuit 8a.

With the present invention, one or more reference discrimination points 12 are further provided in addition to the true discrimination point 11, and discrimination between "H" and "L" with reference to these reference discrimination points 12 is performed in the reference discrimination circuits (8b, 8c, . . . ). More specifically, each of the level shift circuits (6b, 6c, . . . ), each of the clock delay circuits (7b, 7c, . . . ) and each of the reference discrimination circuits (8b, 8c, . . . ) are provided in parallel with, or are connected in the same manner as the first level shift circuit 6a, the first clock delay circuit 7a, and the main discrimination circuit 8a, respectively. In each of the reference discrimination circuits, so as to perform discrimination, a level shift amount by the corresponding level shift circuit (6b, 6c, . . . ) and a clock delay amount by the corresponding clock delay circuit (7b, 7c . . . ) is caused to differ from the level shift amount (an amplification offset amount) by the first level shift circuit 6a and the clock delay amount (a time offset amount) by the first clock delay circuit 7a, respectively. In the eye pattern shown in FIG. 2, these reference discrimination points 12 (shown by x marks) are located at positions other than the position of the true discrimination point 11 (shown by O). More specifically, each of the reference discrimination points 12 is located at a position which is spaced apart from the true discrimination point 11 by a distance related to a difference in the level shift amounts and in the clock delay amounts therebetween. Accordingly, each of the reference discrimination circuits (8b, 8c, . . . ) performs discrimination between two values (namely, discrimination of the signal level as being greater or smaller with regard to the predetermined threshold) using a reference threshold or reference timing which differs from the discrimination threshold or the discrimination timing, respectively, of the main discrimination circuit 8a.

The discrimination results from each of the discrimination circuits 8 are input to the operation circuit 9. The operation circuit 9 has a counter function, and counts the number of cases where the discrimination results using the true discrimination point 11 differ from the discrimination results using the reference discrimination point 12 within a predetermined period, to thereby obtain a ratio of the number of cases with different discrimination results to the number of bits of all the codes to be transmitted within the predetermined period. Because the code discrimination results are correlated with the positions of the discrimination points in an eye pattern, it is possible to estimate a code error rate in the true discrimination point 11, from the ratio of the number of cases with different discrimination results between the true discrimination point 11 and the reference discrimination point 12 and from the positional relationship of these discrimination points on the eye pattern. In other words, by appropriately setting the positional relationship between these discrimination points, the counting period, and the number of cases with different discrimination results, respectively, the operation circuit 9 can generate an alarm signal when the code error rate exceeds the predetermined level.

EXAMPLE 1

Figure 3:
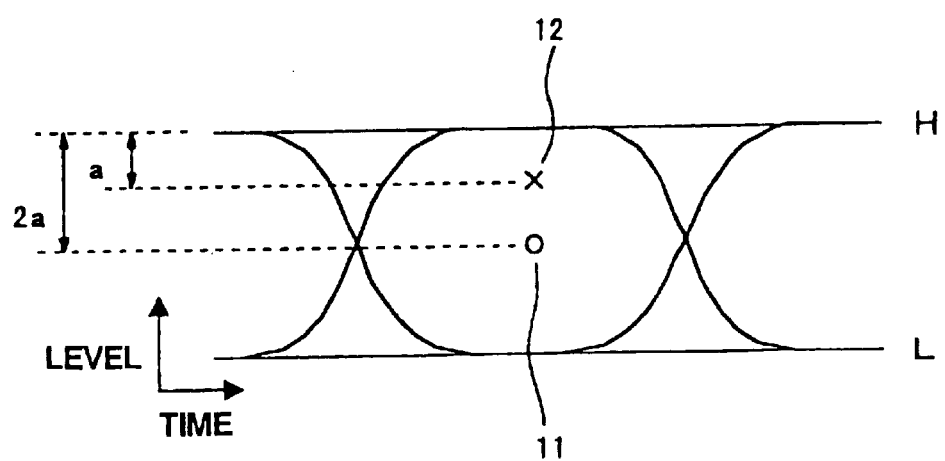
FIG. 3 is a diagram showing an eye pattern and discrimination points of an input signal in a loss of signal detector circuit for a light receiver according to a first example of the preferred embodiment.

A first example of the preferred embodiment of the present invention will be described, in which one reference discrimination point 12 having a level different from (higher than, for example) that of the true discrimination point 11 is provided. FIG. 3 shows an eye pattern for this example. As shown in FIG. 3, in this example, the level of the true discrimination point 11 (namely, the discrimination threshold) is set to be lower than the level of an "H" signal by 2a, and the level of the reference discrimination point 12 (namely, the reference threshold) is set to be lower than the level of an "H" signal by a. The code error rate in the true discrimination point 11, the counting period, and the number of cases where the discrimination results differ between the true discrimination point 11 and the reference discrimination point 12 will be described. In the following example, the signal transmission rate is 2.5 Gb/s, and the period for counting differences by the operation circuit 9, as will be described later, is 40 $\mu$s, and an alarm signal is generated when the code error rate exceeds $10^{-3}$ (0.001).

Figure 4:
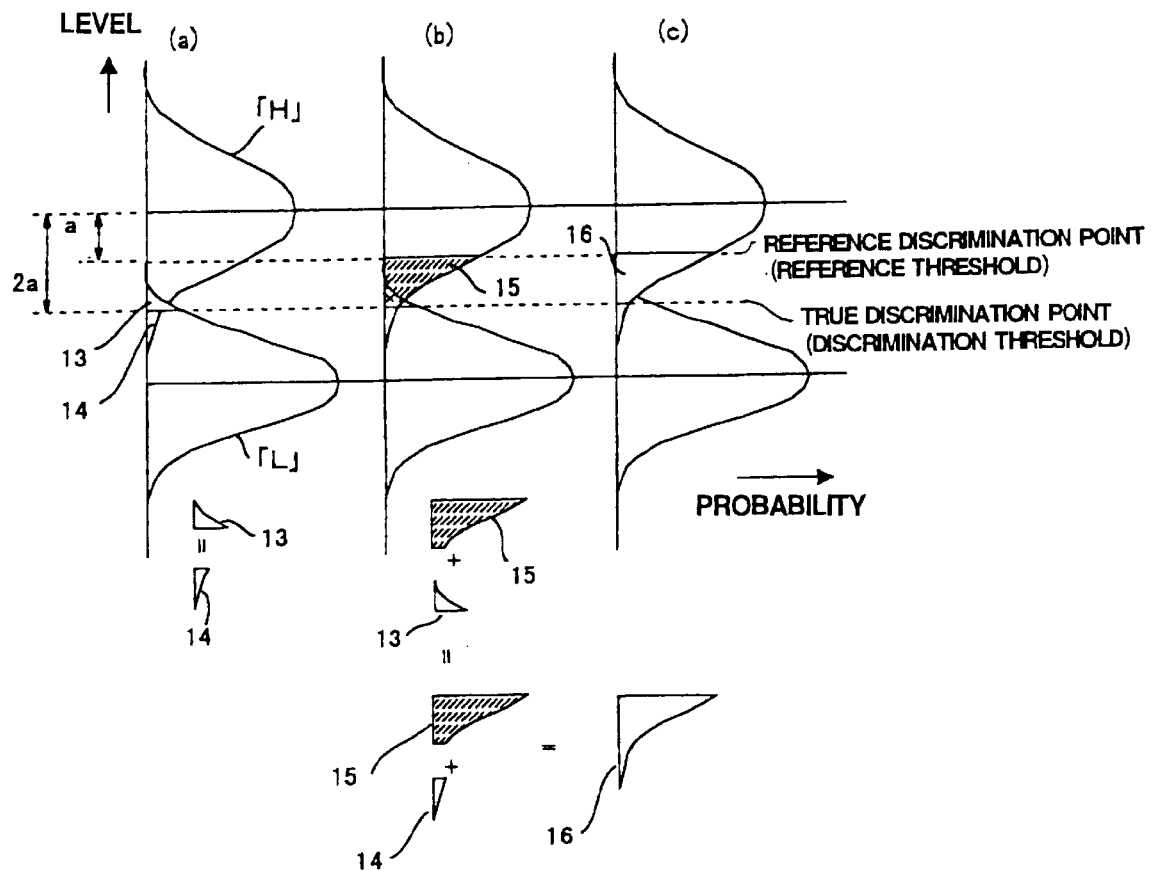
FIG. 4 is an explanatory view showing probability distribution of the signal level and setting of discrimination points in a loss of signal detector circuit for a light receiver according to the first example.

Although each signal is represented by a single line in the eye pattern shown in FIG. 3, it can be assumed that the distribution of signals of "H" level and of "L" level will vary according to the respective probabilities based on a normal distribution when noise components contained in a signal are taken into consideration. This is shown in FIG. 4, in which the vertical axis and the horizontal axis denote level and probability, respectively, and curves at the upper side denote the probability distribution of the detected level of the "H" signal and curves at the lower side denote the probability distribution of the detected level of the "L" signal. In FIG. 4, the probability that an "L" signal is misjudged as an "H" signal is an integration value of a probability distribution in a probability distribution range 13 (namely, an area of the region 13 in FIG. 4), whereas the probability that an "H" signal is misjudged as an "L" signal is an integration value of a probability distribution in a probability distribution range 14 (namely, an area of the region 14 in FIG. 4). In other words, in the normal distribution, a sum of the area of the probability distribution range 13 and the area of the probability distribution range 14 is a code error rate P(R) in the true discrimination point 11. In the present invention, the true discrimination point 11 is set such that the area of the probability distribution range 13 and the area of the probability distribution range 14 are substantially the same. In other words, the level of the true discrimination point 11 (namely, the discrimination threshold) is set such that the probability that an "L" signal is misjudged as an "H" signal above the level of the discrimination threshold (the area of the region 13) and the probability that an "H" signal is misjudged as an "L" signal below the level of the discrimination threshold (namely, the area of the region 14) are substantially the same.

The probability P(D) that the discrimination results at the reference discrimination point 12 differ from the discrimination results at the true discrimination point 11 is a sum of the probability distribution range 15 and the probability distribution range 13, as shown in FIG. 4. Here, the probability that, at the reference discrimination point 12 (namely, the reference threshold), one of the signals having two different levels (i.e., the "L" signal in this case) is misjudged as the other signal (i.e., the "H" signal in this case) is low enough that it can be assumed to be zero. Then, since the probability distribution range 13 is substantially the same as the probability distribution range 14, it can be considered that the above-mentioned probability P(D) is a sum of the probability distribution range 15 and the probability distribution range 14. This corresponds to the upper probability of the normal distribution of the "H" signal at the reference discrimination point 12 (i.e., the probability that the signal is an "H" signal at the level below the reference threshold, in this case). Next, a case where the code error rate P (R) is $10^{-3}$ (0.001) will be considered. In this case, since the sum of the probability distribution range 13 and the probability distribution range 14 is $10^{-3}$, each of the probability distributions 13, 14 (namely, the upper probability in the normal distribution) is $5 \times 10^{-4}$ (0.0005). When the upper probability is $5 \times 10^{-4}$ in the normal distribution, the level of the true discrimination point 11 is $2a=3.3\sigma$, where the variance of the normal distribution is $\sigma$. At this time, the level of the reference discrimination point 12 at a is 1.65 $\sigma$, which is a half the level of the true discrimination point 11, and the upper probability of the normal distribution at this time is 0.0495. Therefore, it is considered that, at the code error rate of $10^{-3}$, the probability that a difference will occur between the discrimination results at the true discrimination point 11 and the discrimination results at the reference discrimination point 12 (a difference occurring probability) is 0.0495. When the transmission rate is 2.5 Gb/s, the total number of codes to be transmitted during a predetermined period (40 msec, for example) for operating the counter in the operation circuit 9 is 100,000 bits. Accordingly, the number of cases where a difference occurs in the discrimination results is counted and integrated by the counter in the operation circuit 9 for the predetermined period (40 msec), and, when the integration results exceed the number corresponding to the above-mentioned difference occurring probability 0.0495 during this period, namely 100,000×0.0495=4950, an alarm signal is generated. In this manner, it is possible to detect loss of signal or to issue an alarm which indicates that the code error rate of $10^{-3}$ is exceeded.

EXAMPLE 2

Figure 5:
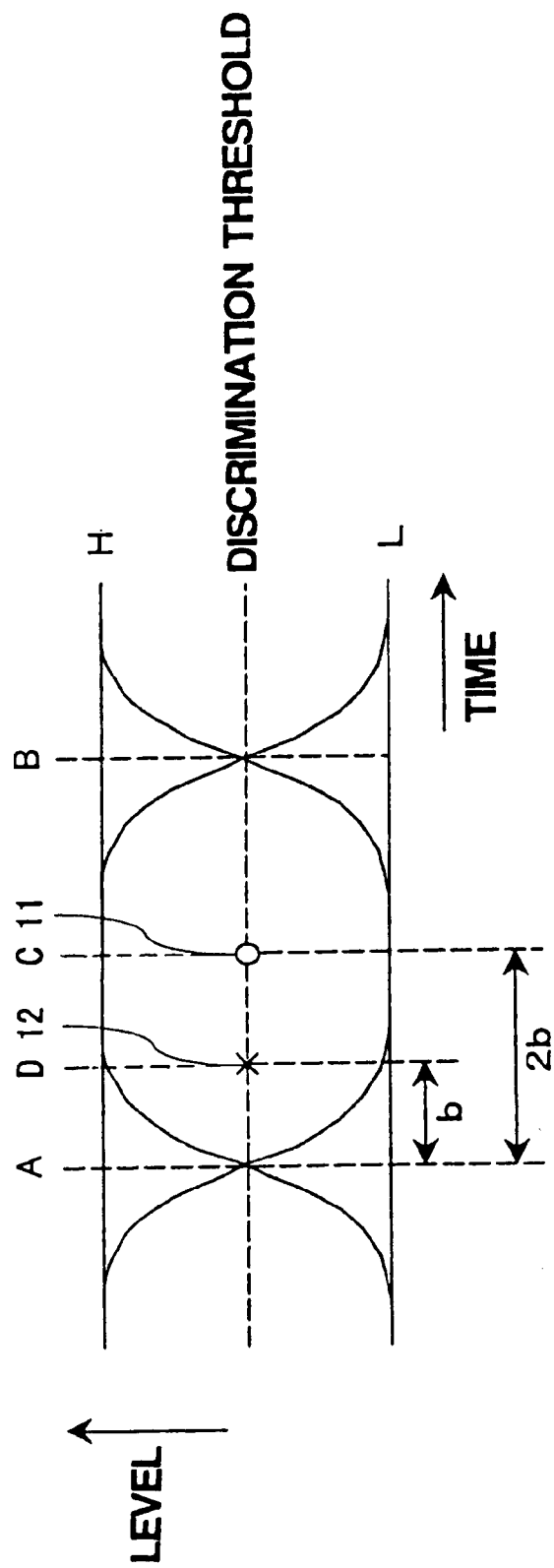
FIG. 5 is a diagram showing an eye pattern and discrimination points of an input signal in a loss of signal detector circuit for a light receiver according to a second example of the preferred embodiment.

In this example, as shown in FIG. 5, a reference discrimination point 12 having a timing different from (earlier than, for example) that of the true discrimination point 11 is provided, and the number of cases where different discrimination results occur with regard to the same discrimination threshold are counted to decide whether an alarm should be issued. The principle of this example will be described.

Figure 6:
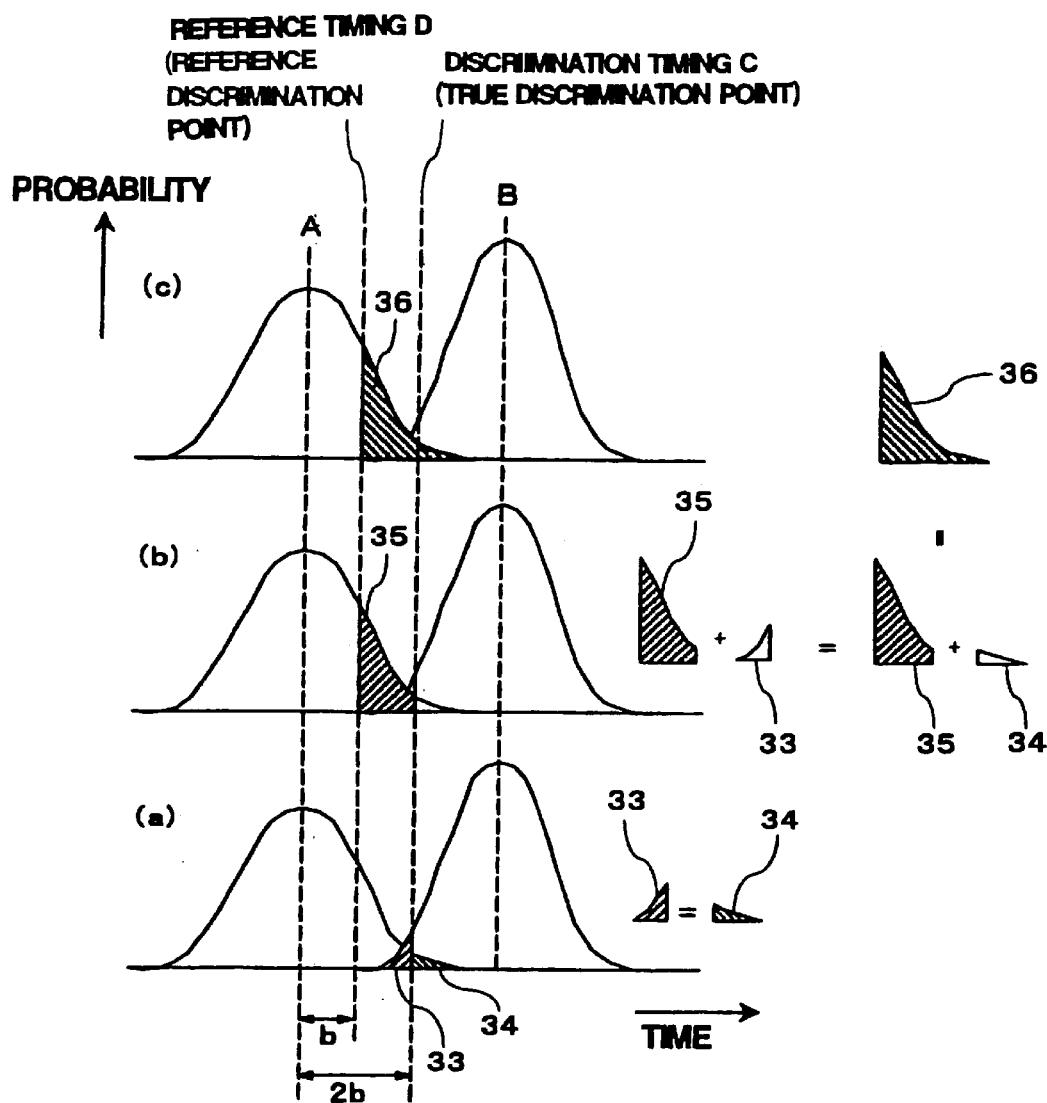
FIG. 6 is a diagram showing probability distribution of the timing when the signal level reaches the discrimination threshold in a loss of signal detector circuit for a light receiver in accordance with the second example.

The probability distribution of a timing when a signal which should reach the discrimination threshold at timing on either side of an eye where a signal changes from "H" to "L", or from "L" to "H" (namely, timing A and B in FIGS. 5 and 6) actually reaches the discrimination threshold is generally a normal distribution shown in FIG. 6, as in the case of the first example.

In this example, the discrimination timing of the true discrimination point 11, timing C, is set such that the probability that a signal which should reach the discrimination threshold at the timing A actually reaches the discrimination threshold at any timing later than the timing C (the area 34 in FIG. 6) and the probability that a signal which should reach the discrimination threshold at the timing B actually reaches the discrimination threshold at any timing earlier than the timing C (the area 33 in FIG. 6) are substantially the same. Further, the reference timing D of the reference discrimination point 12 is set at a timing which is different from (earlier than, for example) the discrimination timing C at which there is substantially no possibility that a signal which should reach the discrimination threshold at the timing B actually reaches the discrimination threshold (namely, the timing which is out of the probability distribution corresponding to B in FIG. 6). The level of the discrimination threshold of the true discrimination point 11 and the reference discrimination point 12 is set dead center between the "H" and "L" levels.

If a signal follows the normal distribution as shown in FIG. 6 under the condition that the two discrimination points are set as described above, the actual probability that a signal which should reach the discrimination value at the timing A actually reaches the discrimination threshold at any timing later than the reference timing D (the area 36 in FIG. 6) equals the probability in the normal distribution of a signal reaching the discrimination threshold at a timing between the reference timing D and the discrimination timing C(a sum of areas 33 and 35 in FIG. 6). However, as the code error rate (which corresponds to a sum of areas 33 and 34 in FIG. 6, in the normal distribution) increases, the actual probability of the signal reaching the discrimination threshold at timing between the reference timing D and the discrimination timing C becomes greater than the probability that a signal which should reach the discrimination value at the timing A actually reaches the discrimination threshold at a timing later than the reference timing D (an area 36 in FIG. 6).

Figure 7:
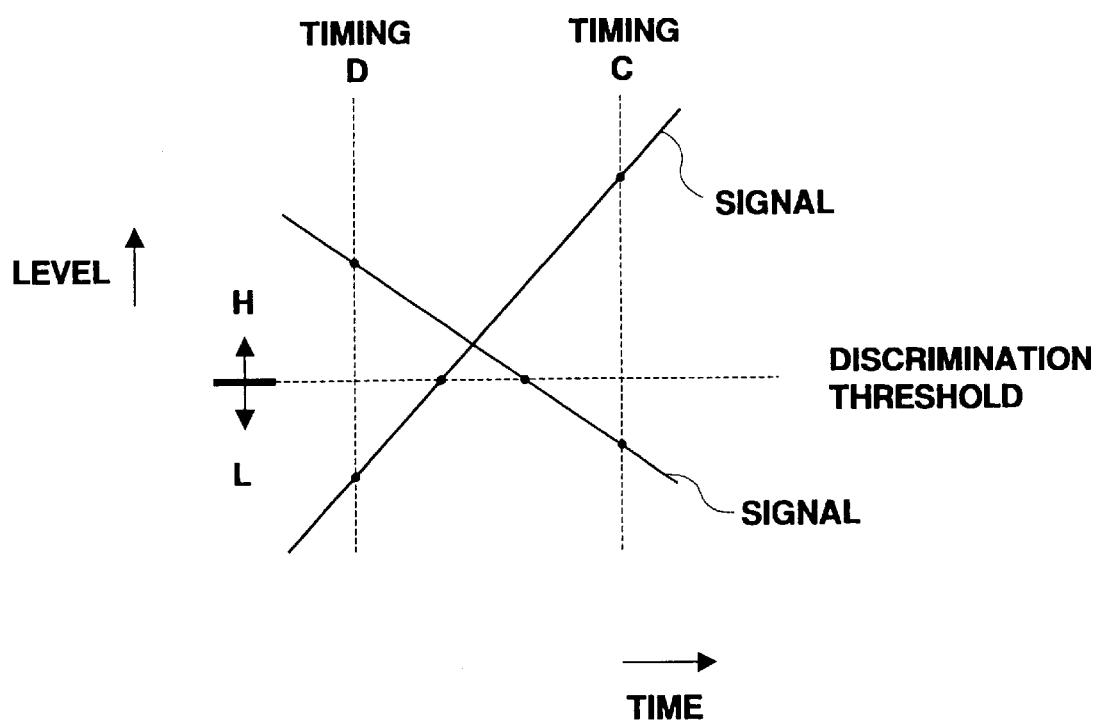
FIG. 7 is an explanatory view showing a signal reaching a discrimination threshold between the discrimination timing and the reference timing in a loss of signal detector circuit for a light receiver in accordance with the second example.
Figure 8:
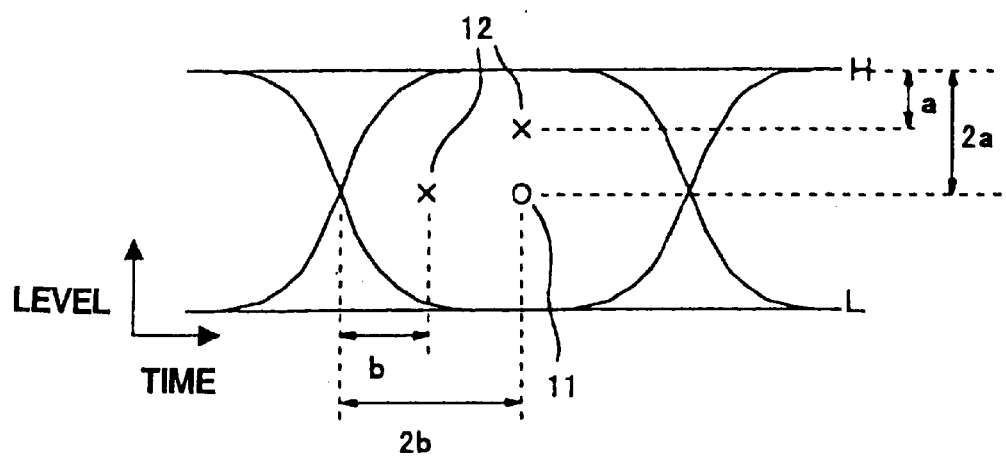
FIG. 8 is a diagram showing an eye pattern and discrimination points of an input signal in a loss of signal detector circuit for a light receiver according to a third example of the preferred embodiment.
Figure 9:
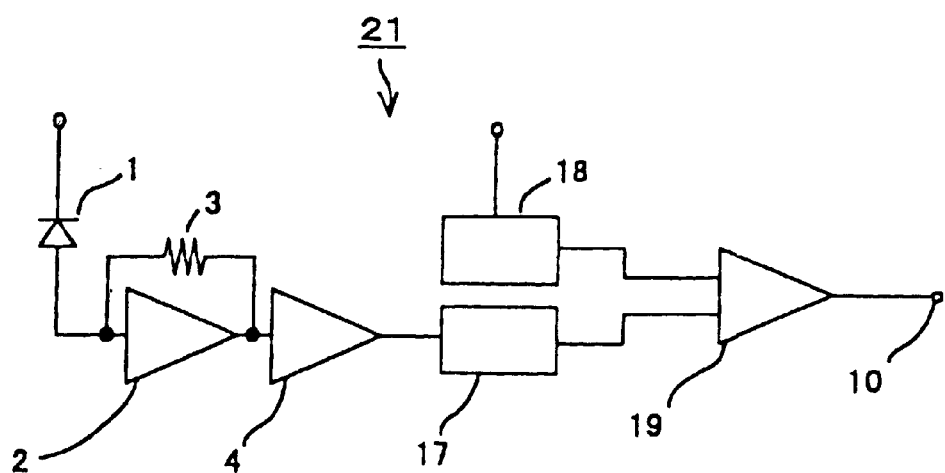
FIG. 9 is a block diagram showing a loss of signal detector circuit for a light receiver according to a related art.

Here, when the level of a signal is high "H" at the reference timing D and is low "L" at the discrimination timing c, or when the level of a signal is low "L" at the reference timing D and is high "H" at the discrimination timing C, as shown in FIG. 7, the signal reaches the discrimination threshold between the reference timing D and the discrimination timing C.

Namely, when the discrimination results with respect to the discrimination threshold at the reference discrimination point 12 differ from the discrimination results with respect to the discrimination threshold at the true discrimination point 11, a signal reaches the discrimination threshold between the discrimination timing C and the reference timing D.

Therefore, when a ratio of the number of signals having different discrimination results between the two discrimination points 11, 12 to the total number of signals which change the levels from "H" to "L", or from "L" to "H" at the timing A exceeds the probability in the normal distribution that a signal which should reach the discrimination value at the timing A actually reaches the discrimination threshold at a timing later than the reference timing D (an area 36 in FIG. 6), it can be determined that the error rate is higher than the code error rate as assumed on the normal distribution.

A case where an alarm is issued when the code error rate exceeds $10^{-3}$ will next be considered. When the code error rate is $10^{-3}$ on the normal distribution, the probability that a signal which should be the discrimination threshold at the timing A actually will reach the discrimination threshold at a timing later than the timing C (the area 34 in FIG. 6), and the probability of a signal which should be the discrimination threshold at the timing B actually reaching the discrimination threshold at a timing earlier than the timing C (an area 33 in FIG. 6) are $5 \times 10^{-4}$. In the normal distribution, when the upper probability is $5 \times 10^{-4}$, the discrimination timing is at 3.3 σ (where σ is a variance). When the reference timing D(b) is set with respect to the discrimination timing C(2b), as shown in FIG. 5, the probability above the reference timing D at b=1.65σ (an area 36 in FIG. 6) is 0.0495. of all the patterns of signal transition occurring before and after the timing A ("H"→"H", "H"→"L", "L"→"H", "L"→"L"), the probability that a signal changes the level "H"→"L", or "L"→"H" is a half. Therefore, when a signal follows the normal distribution, the ratio of the signals having different discrimination results between the two discrimination points 11, 12 to the total number of signals is 0.02475 (=0.0495/2), or is half that of Example 1. When the transmission rate is 2.5 Gb/s, the total number of codes to be transmitted during a predetermined period (40 msec, for example) for operating the counter in the operation circuit 9 is 100,000 bits. Accordingly, the number of cases where a difference occurs in the discrimination results is counted and integrated by the counter in the operation circuit 9 for the predetermined period (40 msec), and when the integration results exceed the number corresponding to the above-mentioned difference occurring probability of 0.02475 during this period, namely 100,000×0.02475=2475, an alarm signal is caused to generate which indicates loss of signal when the code error rate of $10^{-3}$ is exceeded. In this example, it is also possible for discrimination using the true discrimination point 11 to be performed in the main discrimination circuit 8a while discrimination using the reference discrimination point 12 is performed in the reference discrimination circuit 8b.

EXAMPLE 3

In this example, a reference discrimination point 12 having a level which is different from (higher than, for example) that of the true discrimination point 11 and a reference discrimination point 12 having a timing which is different from (earlier than, for example) that of the true discrimination point 11 are both provided, and the number of cases where the discrimination results differ between these reference discrimination points 12 and the true discrimination point 11 are counted in a manner similar to those used in the foregoing first and second examples, such that an alarm is issued when the predetermined code error rate is exceeded. In this example, the first and second examples are combined so that the number of cases where a difference occurs between the discrimination results is counted in each of the level direction and the time axis direction. When both of, or any one of, the counters counts the value exceeding the predetermined number, an alarm is issued, thereby enabling the issue of an alarm indicating that the predetermined code error rate is exceeded.

As described above, according to the first aspect of the present invention, the code error rate in the main discrimination circuit can be detected based on the comparison results using the discrimination threshold and the comparison results using the reference threshold which differs from the discrimination threshold.

Further, according to the second aspect of the present invention, the code error rate in the main discrimination circuit can be detected based on the comparison results at the discrimination timing and the comparison results at the reference timing which differs from the discrimination timing.

Still further, according to the third aspect of the present invention, the code error rate in the main discrimination circuit can be detected based on the comparison results at the discrimination timing using the discrimination threshold, the comparison results using the reference threshold which differs from the discrimination threshold, and the comparison results at the reference timing which differs from the discrimination timing. As a result, the code error rate in the main discrimination circuit can be more precisely detected.

While the preferred embodiment of the present invention has been described using specific terms and illustrative examples, such description is for illustrative purposes only, and it is to be understood that changes and variations may be made without departing from the spirit or scope of the appended claims.

What is claimed is:

1. A loss of signal detector circuit for light receiver comprising:

a main discrimination circuit for comparing the intensity of an electric signal, obtained by photoelectrically converting a light signal using a photoelectric conversion element, with a predetermined discrimination threshold;

a reference discrimination circuit for comparing the intensity of the electric signal with a reference threshold which differs from said discriminaton threshold; and an operation circuit for detecting loss of the signal based on the results of the comparisons performed by said main discrimination circuit and said reference discrimination circuit, wherein said discrimination threshold is determined such that the probability of a low level signal being judged as a high level signal eguals the probability of a high level signal being judged as a low level signal when said discrimination threshold is set in said main discrimination circuit.

2. A loss of signal detector circuit for a light receiver according to claim 1, wherein said operation circuit counts, for a predetermined time period, the number of instances wherein the comparison result indicating that the intensity of an electrical signal is higher or lower than said discrimination threshold differs from the comparison result indicating that the intensity of an electrical signal is higher or lower than said reference threshold, and determines a loss of signal when the counted number exceeds a predetermined value.

3. A light receiver comprising:

a photoelectric conversion element for photoelectrically converting a light signal into an electric signal and a loss of signal detector circuit according to claim 1.

4. A loss of signal detector circuit for a light receiver comprising:

a main discrimination circuit for comparing the intensity of an electric signal, obtained by photoelectrically converting a light signal using a photoelectric conversion element, with a predetermined discrimination threshold at a predetermined discrimination timing;

a reference discrimination circuit for comparing the intensity of the electric signal with said discrimination threshold at a reference timing other than said discrimination timing; and an operation circuit for detecting loss of the signal based on the results of the comparisons performed by said main discrimination circuit and said reference discrimination circuit, wherein said discrimination timing is determined such that the probability that an electrical signal which should reach the discrimination threshold at an earlier signal chance timing in an eye pattern actually reaches the discrimination threshold at a timing later than said earlier signal change timing equals the probability that an electrical signal which should reach the discrimination threshold at a later signal change timing in the eye pattern actually reaches the discrimination threshold at a timing earlier than said later signal change timing, when said discrimination timing is set in said main discrimination circuit.

5. A loss of signal detector circuit for a light receiver according to claim 4, wherein said operation circuit counts, for a predetermined period of time, the number of instances wherein the comparison result indicating that the intensity of an electrical signal is higher or lower than said discrimination threshold at said discrimination timing differs from the comparison result indicating that the intensity of an electrical signal is higher or lower than said discrimination threshold at said reference timing, and determines a loss of signal when the counted number exceeds a predetermined value.

6. A light receiver comprising:
a photoelectric conversion element for photoelectrically converting a light signal into an electric signal and
a loss of signal detector circuit according to claim 4.

7. A loss of signal detector circuit for a light receiver comprising:
a main discrimination circuit for comparing the intensity of an electric signal, obtained by photoelectrically converting a light signal using a photoelectric conversion element, with a predetermined main discrimination threshold at a predetermined main discrimination timing;
a first reference discrimination circuit for comparing, at said main discrimination timing, the intensity of the electric signal with a reference threshold other than said main discrimination threshold;
a second reference discrimination circuit for comparing the intensity of the electric signal with said main discrimination threshold at a reference timing other than said main discrimination timing; and
an operation circuit for detecting loss of the signal based on the results of the comparisons performed by said main discrimination circuit, said first reference discrimination circuit, and said second reference discrimination circuit,
wherein said discrimination threshold is determined such that the probability of a low level signal being judged as a high level signal equals the probability of a high level signal being judged as a low level signal when said discrimination threshold is set in said main discrimination circuit, and
wherein said discrimination timing is determined such that the probability that an electrical signal which should reach the discrimination threshold at an earlier signal change timing in an eye pattern actually reaches the discrimination threshold at a timing later than said earlier signal change timing equals the probability that an electrical signal which should reach the discrimination threshold at a later signal change timing in the eye pattern actually reaches the discrimination threshold at a timing earlier than said later signal change timing, when said discrimination timing is set in said main discrimination circuit.

8. A light receiver comprising:
a photoelectric conversion element for photoelectrically converting a light signal into an electric signal and
a loss of signal detector circuit according to claim 7.

* * * * *